United States Patent
Nishisaka et al.

(10) Patent No.: US 9,520,237 B2
(45) Date of Patent: Dec. 13, 2016

(54) MONOLITHIC CERAMIC ELECTRONIC COMPONENT

(71) Applicant: Murata Manufacturing Co., Ltd., Nagaokakyo-shi, Kyoto-fu (JP)

(72) Inventors: Yasuhiro Nishisaka, Nagaokakyo (JP); Kotaro Shimizu, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 46 days.

(21) Appl. No.: 14/674,283

(22) Filed: Mar. 31, 2015

(65) Prior Publication Data

US 2015/0279567 A1  Oct. 1, 2015

(30) Foreign Application Priority Data

Mar. 31, 2014 (JP) .................... 2014-072862

(51) Int. Cl.
| | |
|---|---|
| *H01G 4/248* | (2006.01) |
| *H01G 4/012* | (2006.01) |
| *H01G 4/12* | (2006.01) |
| *H01G 4/30* | (2006.01) |
| *H01G 4/232* | (2006.01) |

(52) U.S. Cl.
CPC .............. *H01G 4/248* (2013.01); *H01G 4/012* (2013.01); *H01G 4/1227* (2013.01); *H01G 4/1245* (2013.01); *H01G 4/232* (2013.01); *H01G 4/2325* (2013.01); *H01G 4/30* (2013.01); *H01G 4/12* (2013.01)

(58) Field of Classification Search
CPC ...... H01G 4/228; H01G 4/232; H01G 4/2325; H01G 4/248; H01G 4/252
See application file for complete search history.

(56) References Cited

U.S. PATENT DOCUMENTS

| | | | |
|---|---|---|---|
| 6,081,181 A | 6/2000 | Kawase et al. | |
| 8,259,433 B2 | 9/2012 | Nishisaka et al. | |
| 2008/0080122 A1* | 4/2008 | Togashi | H01G 4/232 361/303 |
| 2008/0239617 A1* | 10/2008 | Motoki | H01G 4/232 361/301.4 |
| 2010/0123994 A1 | 5/2010 | Nishisaka et al. | |

(Continued)

FOREIGN PATENT DOCUMENTS

| | | |
|---|---|---|
| JP | H07-66070 A | 3/1995 |
| JP | H10-116704 A | 5/1998 |

(Continued)

*Primary Examiner* — Dion R Ferguson
(74) *Attorney, Agent, or Firm* — Arent Fox LLP

(57) ABSTRACT

Outer electrodes include end-surface outer electrodes arranged on end surfaces of a ceramic multilayer body, and side-surface outer electrodes on side surfaces of the ceramic multilayer body, the side-surface outer electrodes being electrically connected to the end-surface outer electrodes. Sputtered electrode layers of the side-surface outer electrodes in contact with the ceramic multilayer body are composed of a material containing a metal with a standard redox potential of about −2.36 V to about −0.74 V, the proportion of the metal in the material being about 3% by mass or more. Sputtered outermost electrode layers serving as the outermost layers of the side-surface outer electrodes are composed of a metal or an alloy in which the heat of solution of hydrogen is about 23.8 kJ/molH or more.

9 Claims, 2 Drawing Sheets

(56) References Cited

U.S. PATENT DOCUMENTS

2013/0208401 A1* 8/2013 Shirakawa ............. H01G 13/06
361/305
2014/0063684 A1* 3/2014 Lee ......................... H01G 4/30
361/301.4

FOREIGN PATENT DOCUMENTS

| JP | H11-233371 A | 8/1999 |
| JP | 2005-340589 A | 12/2005 |
| JP | 2010-141300 A | 6/2010 |
| JP | 2012-190874 A | 10/2012 |
| JP | 2012-231047 A | 11/2012 |
| JP | 5287658 B2 | 9/2013 |

* cited by examiner

MONOLITHIC CERAMIC ELECTRONIC COMPONENT

BACKGROUND OF THE INVENTION

1. Field of the Invention

The present invention relates to a monolithic ceramic electronic component, and in particular, to a monolithic ceramic electronic component having a structure that includes a ceramic multilayer body including stacked ceramic layers; and outer electrodes arranged on surfaces of the ceramic multilayer body, the ceramic multilayer body including inner electrodes arranged therein, and the outer electrodes being electrically connected to the inner electrodes.

2. Description of the Related Art

As an example of a method for producing a monolithic ceramic capacitor, which is a typical monolithic ceramic electronic component, Japanese Unexamined Patent Application No. 2012-190874 discloses a method for producing a monolithic ceramic capacitor, as described below.

In the method for producing a monolithic ceramic capacitor described in Japanese Unexamined Patent Application Publication No. 2012-190874, first and second green sheets on which green inner electrode layers are formed are prepared, and then the first and second green sheets are alternately stacked in such a manner that electrostatic capacitance-forming portions lie on top of each other, thereby producing a green ceramic multilayer body.

The green ceramic multilayer body is cut into pieces corresponding to chip regions, thereby exposing extension portions of the green inner electrode layers at end surfaces of the pieces of the green ceramic multilayer body. A conductive paste is applied to the end surfaces of the pieces of the green ceramic multilayer body where the extension portions of the green inner electrode layers are exposed, thereby forming green underlying metal layers.

The pieces of the green ceramic multilayer body are fired to co-fire the green sheets, the green inner electrode layers, and the green underlying metal layers. Plating is performed on surfaces of underlying metal layers that have been produced by firing the green underlying metal layers.

Thereby, for example, a monolithic ceramic electronic component as illustrated in FIG. 2 is produced, the monolithic ceramic electronic component having a structure in which inner electrodes 102a and 102b are arranged in a ceramic multilayer body 110 so as to be located opposite each other with ceramic layers 101 and in which outer electrodes 104a and 104b are arranged on end surfaces 103a and 103b of the ceramic multilayer body 110 so as to be electrically connected to the inner electrodes 102a and 102b extending to the end surfaces 103a and 103b, respectively, which differ from each other, of the ceramic multilayer body 110.

In the production method described in Japanese Unexamined Patent Application Publication No. 2012-190874, the conductive paste is applied to the end surfaces of the pieces of the green ceramic multilayer body and baked. That is, the applied conductive paste is co-fired with the pieces of the green ceramic multilayer body. Thus, the outer electrodes disadvantageously have a large thickness (usually, about 10 µm or more), thereby increasing dimensions of a monolithic ceramic capacitor as a product.

In particular, in the case of a built-in monolithic ceramic electronic component for a multilayer substrate, the built-in monolithic ceramic electronic component being required to minimize the thickness dimension, i.e., height dimension, of a product, the thickness of the outer electrodes has a non-negligible effect on the thickness dimension, i.e., height dimension, of a product.

Here, it is conceivable that the thickness of the conductive paste applied is reduced by reducing the specific gravity of the conductive paste. In other words, it is conceivable that the conductive paste is applied so as to have a smaller thickness. In this case, the continuity of the electrodes is disadvantageously reduced at edge line portions (corner portions) of a ceramic multilayer body, thus leading to insufficient reliability.

Japanese Patent No. 5287658 discloses a method for producing a ceramic electronic component (in an embodiment, a monolithic ceramic capacitor) as described below.

In the method described in Japanese Patent No. 5287658, a predetermined number of ceramic green sheets for outer layers having no inner electrode pattern are stacked. A predetermined number of ceramic green sheets on which a first inner electrode pattern is formed by printing and a predetermined number of ceramic green sheets on which a second inner electrode pattern is formed by printing are alternately stacked thereon. A predetermined number of the ceramic green sheets for outer layers having no inner electrode pattern are stacked thereon. Thereby, a mother multilayer body is produced.

Outer terminal electrode patterns to be formed into first and second outer terminal electrodes are formed on upper and lower surfaces of the resulting mother multilayer body by screen printing or the like.

The mother multilayer body is divided by cutting at predetermined positions into individual ceramic multilayer bodies (green ceramic bodies). The ceramic multilayer bodies are subjected to barrel polishing. Then a conductive paste is applied to end surfaces and baked to form the outer terminal electrodes. Thereby, ceramic electronic components are produced.

In the method for producing a ceramic electronic component (in an embodiment, a monolithic ceramic capacitor) described in Japanese Patent No. 5287658, the outer terminal electrode patterns to be formed into portions of the first and second outer terminal electrodes extending from the end surfaces to the upper and lower surfaces (side surfaces) are formed by the screen printing or the like. It is thus possible to reduce the thickness of the outer terminal electrodes on the upper and lower surfaces (side surfaces) of the ceramic multilayer body, compared with the thickness described in Japanese Unexamined Patent Application Publication No. 2012-190874. This results in a reduction in the thickness dimension (height dimension) of the ceramic electronic component.

In the method described in Japanese Patent No. 5287658, however, although the thickness of the outer terminal electrodes on the upper and lower surfaces can be reduced, the thickness is reduced to the extent of about 5 µm. If the thickness is further reduced, the electrodes are ground at the time of barrel polishing treatment to make the edge lines round after the mother multilayer body is divided into pieces. This disadvantageously leads to the failure of subsequent plating and a reduction in conduction reliability.

SUMMARY OF THE INVENTION

To overcome the foregoing problems, it is an object of the present invention to provide a highly reliable monolithic ceramic electronic component having small outer electrodes in thickness, excellent adaptability to the trend toward smaller size and lower profile of a product, excellent adhesion strength of the outer electrodes to a ceramic body (ceramic multilayer body), and excellent resistance to a plating solution.

To solve the foregoing problems, according to preferred embodiments of the present invention, a monolithic ceramic electronic component having a structure includes a ceramic multilayer body including stacked ceramic layers and inner electrodes arranged in the ceramic multilayer body, and outer electrodes arranged on surfaces of the ceramic multilayer body, the outer electrodes being electrically connected to the inner electrodes, in which (a) the outer electrodes include end-surface outer electrodes arranged on end surfaces of the ceramic multilayer body, the inner electrodes extending to the end surfaces, and side-surface outer electrodes formed by a sputtering method on side surfaces in contact with the end surfaces of the ceramic multilayer body, the side-surface outer electrodes being electrically connected to the end-surface outer electrodes, and (b) the side-surface outer electrodes include sputtered electrode layers and sputtered outermost electrode layers, the sputtered electrode layers being in contact with the ceramic multilayer body and including a material containing a metal with a standard redox (reduction-oxidation) potential of about −2.36 V to about −0.74 V, the proportion of the metal in the material being about 3% by mass or more, the sputtered outermost electrode layers serving as outermost layers of the side-surface outer electrodes and including a metal or an alloy in which the heat of solution of hydrogen is about 23.8 kJ/molH or more.

According to preferred embodiments of the present invention, the metal contained in the sputtered electrode layers of the side-surface outer electrodes in contact with the ceramic multilayer body is preferably at least one selected from the group consisting of Mg, Al, Ti, W, and Cr.

The sputtered electrode layers of the side-surface outer electrodes in contact with the ceramic multilayer body contain the metal. This results in the high adhesion strength of the outer electrodes to the ceramic multilayer body and allows preferred embodiments of the present invention to be more effective. That is, a metal (at least one selected from Mg, Al, Ti, W, and Cr) having a standard redox potential of about −2.36 V to about −0.74 V and a lower standard redox potential is used as the metal contained in the layer in contact with the ceramic multilayer body, thereby enabling the formation of the outer electrodes provided with end-surface outer electrodes having excellent adhesion to the ceramic multilayer body and a small thickness, the outer electrodes having high reliability as a whole.

According to preferred embodiments of the present invention, the metal contained in the sputtered outermost electrode layers of the side-surface outer electrodes is preferably at least one selected from the group consisting of Cu, Al, and Ag, or an alloy containing at least one selected from the group consisting of Cu, Al, and Ag.

At least one selected from Cu, Al, and Ag, or an alloy containing at least one selected from Cu, Al, and Ag is used as the metal contained in the outermost layer (sputtered outermost electrode layers) of the side-surface outer electrodes. This improves resistance to a plating solution used at the time of plating for the outer electrodes and resistance to hydrogen generated in a plating process, thereby allowing the highly reliable outer electrodes to be more assuredly formed.

According to preferred embodiments of the present invention, preferably, the monolithic ceramic electronic component further includes metal films formed by plating on surfaces of the outer electrodes.

For example, in the case where the monolithic ceramic electronic component is used in a state in which the monolithic ceramic capacitor is buried in a ceramic substrate, the arrangement of Cu plating films on the surfaces of the outer electrodes improves resistance to laser processing to increase the via-connection reliability when via holes are formed by laser processing to establish electrical continuity with the buried monolithic ceramic electronic component. In the case where the monolithic ceramic electronic component is solder-mounted, the arrangement of Ni plating films and Sn plating films on the surfaces of the outer electrodes improves the solderability.

In the monolithic ceramic electronic component according to preferred embodiments of the present invention, the layers of the side-surface outer electrodes in contact with the ceramic multilayer body is composed of a material containing a metal with a standard redox potential of about −2.36 V to about −0.74 V, the proportion of the metal in the material being about 3% by mass or more, and the outermost layers (sputtered outermost electrode layers) of the side-surface outer electrodes is composed of a metal or an alloy in which the heat of solution of hydrogen is about 23.8 kJ/molH or more. This provides the monolithic ceramic electronic component having small outer electrodes in thickness, excellent adaptability to the trend toward smaller size and lower profile of a product, and having high reliability.

That is, in the monolithic ceramic electronic component according to preferred embodiments of the present invention, the layers (sputtered electrode layers) of the side-surface outer electrodes in contact with the ceramic multilayer body are composed of the material containing the metal (with a lower redox potential) with a standard redox potential of about −2.36 V to about −0.74 V, the proportion of the metal in the material being about 3% by mass or more. This results in high adhesion strength of the outer electrodes to the ceramic multilayer body. The outermost layers (sputtered outermost electrode layers) of the side-surface outer electrodes are composed of a metal or an alloy in which the heat of solution of hydrogen is about 23.8 kJ/molH or more. This improves resistance to a plating solution used at the time of plating for the outer electrodes and resistance to hydrogen generated in a plating process, thereby enabling the formation of the highly reliable outer electrodes.

When the outermost layers are subjected to plating treatment to form plating films thereon, the outermost layers (sputtered outermost electrode layers) of the side-surface outer electrodes need to have electrical conductivity. In the case where the formation of the plating film is performed, if hydrogen generated at the time of a plating process is taken in the outermost layers (sputtered outermost electrode layers) and diffused in the inner electrodes, the inner electrodes (composed of, for example, Ni) are expanded, thereby reducing the reliability. For this reason, the outermost layers (sputtered outermost electrode layers) need to be composed of a metal in which hydrogen is not easily dissolved. In preferred embodiments of the present invention, thus, a metal, for example, Cu, Al, or Ag, in which the heat of solution of hydrogen is about 23.8 kJ/molH or more, or an alloy containing the metal is used.

In the case where the value of the heat of solution of hydrogen is negative, a larger absolute value of the negative value has a tendency to allow a hydrogenation reaction to proceed spontaneously. In the case where the value of the heat of solution of hydrogen is positive, a lower value results in the dissolution of hydrogen in a metal at even a small external stress. A higher value is less likely to cause hydrogen to be dissolved.

In preferred embodiments of the present invention, the metal contained in the outermost layers (sputtered outermost electrode layers) is a metal in which the heat of solution of hydrogen is about 23.8 kJ/molH or more and in which hydrogen is not easily dissolved. This results in high resistance to a plating solution used at the time of plating for the outer electrodes and high resistance to hydrogen generated in a plating process.

The end-surface outer electrodes may be formed by a common method, such as a method in which, for example, a conductive paste containing a Ni powder serving as a conductive component is applied by a dipping method and baked. The resulting end-surface outer electrodes have excellent reliability of electrical continuity with the inner electrodes.

Preferred embodiments of the present invention provide the highly reliable monolithic ceramic electronic component including the outer electrodes having excellent adhesion strength to the ceramic multilayer body, resistance to a plating solution, reliability of electrical continuity, and satisfactory characteristics.

The monolithic ceramic electronic component according to preferred embodiments of the present invention includes the outer electrodes having a structure as described above. This results in a quality comparable to that of the existing monolithic ceramic electronic components provided with outer electrodes having large thickness while the outer electrodes are reduced in thickness. The effects are provided by the following factors: The outer electrodes have a structure including the end-surface outer electrodes and the side-surface outer electrodes electrically connected to the end-surface outer electrodes. The side-surface outer electrodes are formed by a sputtering method. Each of the end-surface outer electrodes has a structure including two or more layers and having a small thickness. Regarding the layers in contact with the ceramic multilayer body, the thin, uniform metal films having a low standard redox potential, which cannot be formed by an electrolytic plating method, are formed by a sputtering method. The outermost layers are composed of the metal or the alloy in which the heat of solution of hydrogen is about 23.8 kJ/molH or more. That is, the metal or alloy in which hydrogen is not easily dissolved is used.

In Japanese Patent No. 5287658 described above, electrodes are formed by screen printing on a mother multilayer body (block). Thus, the wear (chipping) and detachment of outer electrodes occur in the step of performing chamfering by barrel polishing after the mother multilayer body is cut into pieces. In preferred embodiments of the present invention, it is possible to cut a mother multilayer body into pieces, perform chamfering by barrel polishing, and then form the outer electrodes. This results in the highly reliable outer electrodes having small thicknesses without causing the wear or detachment of the barrel polishing.

According to preferred embodiments of the present invention, the side-surface outer electrodes are formed of the sputtered films. This achieves the planarization of the side-surface outer electrodes in addition to a reduction in the thickness of the side-surface outer electrodes, thereby reducing the variations in the height dimension of the monolithic ceramic electronic component as a product and improving the attitude stability at the time of mounting. Thus, for example, in the case where the monolithic ceramic electronic component is used in a state in which the monolithic ceramic electronic component is buried in a ceramic substrate, when via holes are formed by laser processing to establish electrical continuity with the buried monolithic ceramic electronic component, the via-connection reliability is improved.

In the case of a monolithic ceramic electronic component with a stringent limitation on the thickness dimension, such as a low-profile monolithic ceramic capacitor used in a state in which the capacitor is buried, a unit thickness, which indicates the thickness of the monolithic ceramic electronic component excluding the thickness of the side-surface outer electrodes, may be designed so as to be larger than that of the related art without increasing the entire thickness of a product because of a reduction in the thickness of outer electrodes. This achieves improvement in mounting strength.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

The features of the present invention will be described in more detail below by embodiments of the present invention.

Figure 1:
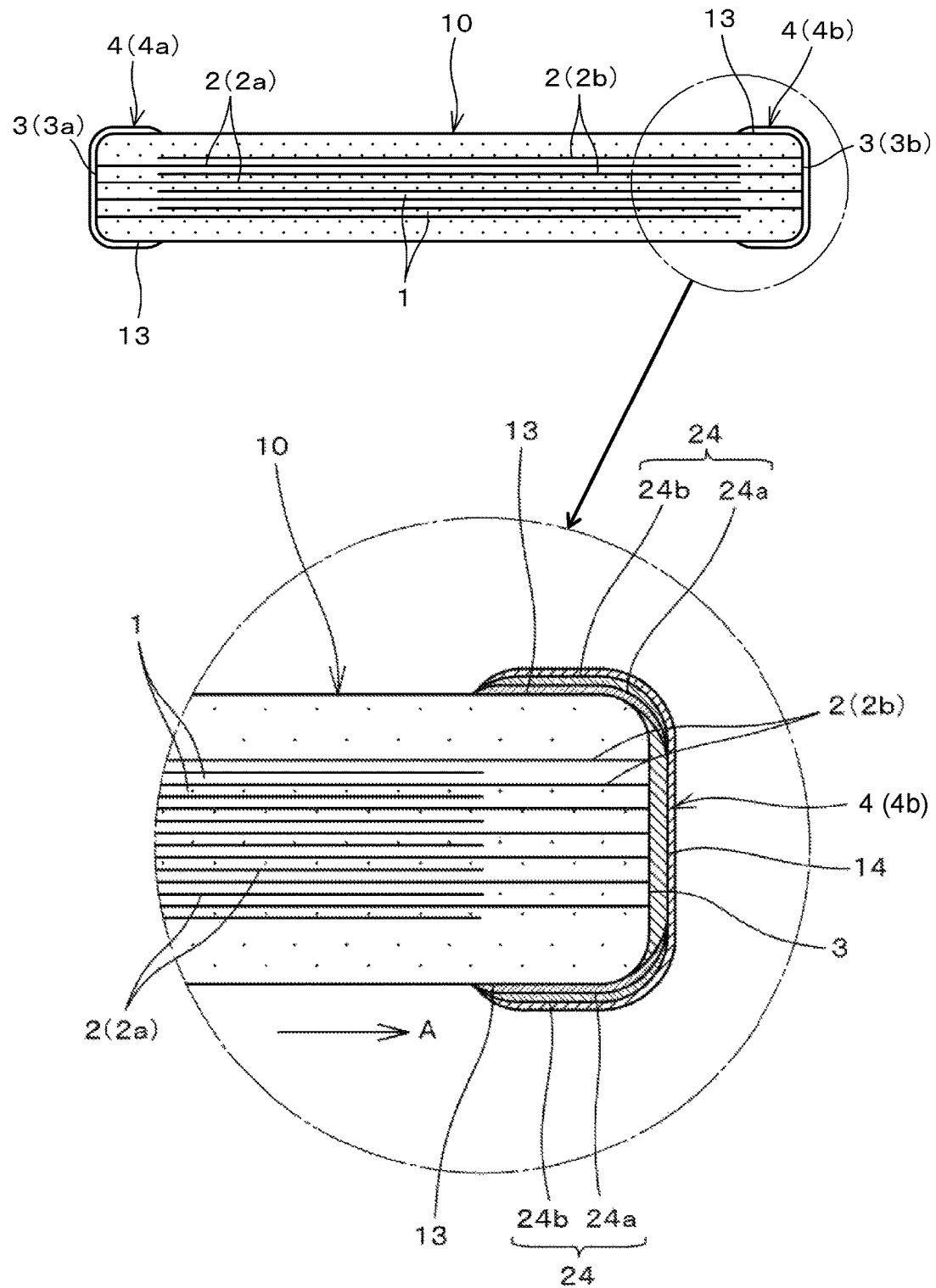
FIG. 1 is a front sectional view of the structure of a monolithic ceramic electronic component (low-profile monolithic ceramic capacitor) according to an embodiment of the present invention.
Figure 2:
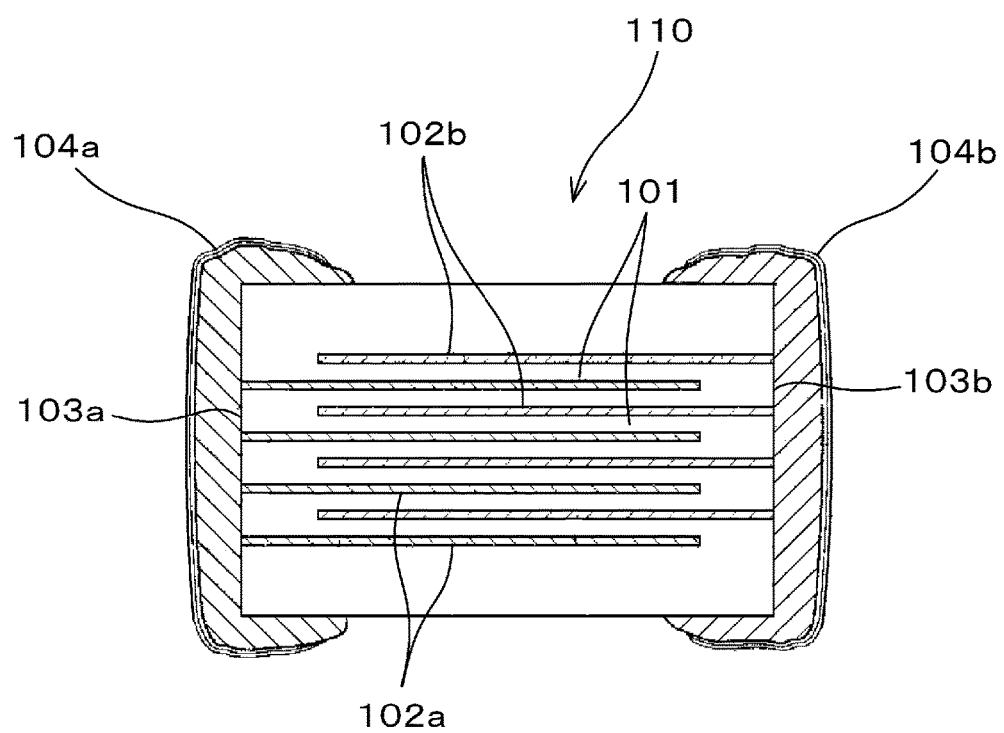
FIG. 2 is a front sectional view of the structure of a monolithic ceramic electronic component of the related art.

FIG. 1 is a front sectional view of the structure of a monolithic ceramic electronic component (low-profile monolithic ceramic capacitor in this embodiment) according to an embodiment of the present invention.

As illustrated in FIG. 1, the monolithic ceramic capacitor is a low-profile monolithic ceramic capacitor used in a state in which the monolithic ceramic capacitor is buried in a ceramic substrate, the monolithic ceramic capacitor having a structure including a ceramic multilayer body (monolithic ceramic capacitor device) 10 in which a plurality of inner electrodes 2 (2a and 2b) are stacked with ceramic layers 1 serving as dielectric layers, outer electrodes 4 (4a and 4b) being arranged on both end surfaces 3 (3a and 3b) of the ceramic multilayer body and being electrically connected to the inner electrodes 2 (2a and 2b).

The outer electrodes 4 (4a and 4b) extend from the both end surfaces 3 (3a and 3b) of the ceramic multilayer body 10 having a substantially rectangular parallelepiped shape to about four side surfaces 13 of the ceramic multilayer body.

The outer electrodes 4 of the monolithic ceramic capacitor according to this embodiment include end-surface outer electrodes 14 arranged on the end surfaces 3 of the ceramic multilayer body 10 to which the inner electrodes 2 extend; and side-surface outer electrodes 24 arranged on the side surfaces 13 in contact with the end surfaces 3 of the ceramic multilayer body 10, the side-surface outer electrodes 24 being electrically connected to the end-surface outer electrodes 14.

Each of the end-surface outer electrodes 14 is formed of one or more electrode layers (Ni electrode layers). In this embodiment, each of the end-surface outer electrodes 14 is a Ni electrode formed by baking a Ni paste.

Each of the side-surface outer electrodes 24 includes a sputtered electrode layer 24a in contact with the ceramic multilayer body 10; and a sputtered outermost electrode layer 24b serving as the outermost layer of the corresponding side-surface outer electrode 24, the sputtered electrode layer 24a and the sputtered outermost electrode layer 24b being formed by a sputtering method.

In the monolithic ceramic electronic component according to an embodiment of the present invention, the sputtered electrode layer 24a in contact with the ceramic multilayer body 10 is composed of a material containing a metal with a standard redox potential of about −2.36 V to about −0.74 V (for example, at least one selected from the group consisting of Mg, Al, Ti, W, and Cr), the proportion of the metal in the material being about 3% by mass or more.

The sputtered outermost electrode layer 24b serving as the outermost layer is composed of a metal or an alloy in which the heat of solution of hydrogen is about 23.8 kJ/molH or more (for example, at least one metal selected from the group consisting of Cu, Al, and Ag, or an alloy containing at least one metal selected from the group consisting of Cu, Al, and Ag).

Production of Monolithic Ceramic Capacitor

To produce the monolithic ceramic capacitor, a plurality of ceramic green sheets on which electrode patterns to be formed into inner electrodes were formed, and ceramic green sheets for outer layers to be formed into outer layer portions on the sides of both upper and lower surfaces, ceramic green sheets for outer layers having no electrode pattern to be formed into inner electrodes, were prepared. The ceramic green sheets were stacked in a predetermined order to form a mother multilayer body.

The mother multilayer body was divided by cutting into pieces, thereby providing individual green ceramic multilayer bodies (monolithic ceramic capacitor devices).

As a ceramic material contained in the ceramic multilayer body (ceramic material contained in the ceramic green sheets), a dielectric ceramic containing, for example, $BaTiO_3$, $CaTiO_3$, $SrTiO_3$, or $CaZrO_3$ as a main component may be used.

In addition, a material in which an auxiliary component, for example, a Mn compound, a Mg compound, a Si compound, a Co compound, a Ni compound, or a rare-earth element compound, is added to the main component may also be used.

Conductor patterns to be formed into inner electrodes configured to form capacitance are formed by printing or applying a conductive paste containing Ni serving as a main conductive component on surfaces of ceramic green sheets by a method, such as screen printing.

A conductive paste containing another metal material serving as a conductive component may also be used. A method other than the screen printing may also be employed as a method of application on the ceramic green sheets.

A method for forming the outer electrodes including the end-surface outer electrodes and the side-surface outer electrodes will be described below.

(1) Formation of End-Surface Outer Electrode

A Ni co-fireable paste (a conductive paste which was capable of being co-fired with the ceramic multilayer body and which contained a Ni powder serving as a conductive component) was applied to the end surfaces of the ceramic multilayer body before firing (green ceramic multilayer body).

As the Ni co-fireable paste, a paste containing a Ni metal powder and the foregoing ceramic powder (a ceramic powder having the same composition as the ceramic material contained in the ceramic green sheets (common material)) was used. In this embodiment, a paste in which the ratio of the Ni metal powder to the common material (Ni/common material) was about 60/40 (vol %) was used as the Ni co-fireable paste. As the Ni metal powder, a Ni metal powder having a particle diameter of about 0.5 μm was used.

The Ni co-fireable paste was formed into a paste layer having a thickness of about 30 μm on a stage with a squeegee. The end surfaces of the green ceramic multilayer body were dipped into the paste layer. Thereby, the conductive paste was applied to the end surfaces of the green ceramic multilayer body.

At this time, the thickness of the Ni co-fireable paste formed on the stage is as small as about 30 μm, so the Ni co-fireable paste is applied almost only to the end surfaces. Only a small amount of the paste extends to the side surfaces of the green ceramic multilayer body beyond the edge lines. However, the paste does not extend to the side surfaces enough to affect the dimension in the thickness direction of a monolithic ceramic capacitor as a product.

Subsequently, the green ceramic multilayer body and the Ni co-fireable paste were co-fired to form the end-surface outer electrodes (baked electrodes) 14 (see FIG. 1).

Each of the end-surface outer electrodes is an electrode (baked Ni electrode) having a thickness of about 10 μm at the center of the corresponding end surface and having a single-layer structure.

(2) Formation of Side-Surface Outer Electrode

The fired ceramic multilayer body with the end-surface outer electrodes (baked Ni electrodes) formed as described above was set to a special mask jig. The mask jig is configured to expose only regions where the side-surface outer electrodes (electrodes included in the outer electrodes together with the end-surface outer electrodes) will be formed.

The ceramic multilayer body was placed at a sputtering apparatus while only the regions of the ceramic multilayer body where the side-surface outer electrodes will be formed were exposed. Sputtered Ti films (sputtered electrode layers in contact with the ceramic multilayer body 10) 24a were formed on the predetermined regions on the side surfaces of the ceramic multilayer body (target regions on the upper and lower surfaces of the ceramic multilayer body) by a sputtering method. Sputtered Cu films (sputtered outermost electrode layers) 24b were formed on the sputtered Ti films 24a by the sputtering method. The sputtered Ti films 24a and the sputtered Cu films 24b constitute the side-surface outer electrodes 24 each having a two-layer structure.

In this embodiment, the sputtered Ti films each having a film thickness of about 100 nm were formed as the layers (sputtered electrode layers) of the side-surface outer electrodes 24 in contact with the ceramic multilayer body 10. The sputtered Cu films each having a film thickness of about 600 nm were formed thereon as the outermost layers (sputtered outermost electrode layers) of the side-surface outer electrodes 24.

Here, Ti is a metal having a standard redox potential of about −1.63 V. Cu is a metal in which the heat of solution of hydrogen is about 42 kJ/molH (which is about 23.8 kJ/molH or more).

Table 1 describes sputtering conditions of Ti and Cu mentioned above.

TABLE 1

| Item | | Reference |
|---|---|---|
| Input power | Target: Ti | about 1.00 ± about 0.10 kW |
| | Target: Cu | about 2.2 ± about 0.10 kW |
| Degree of vacuum | | about $5.0 \times 10^{-0}$ Pa to about $1.0 \times 10^{-0}$ Pa |
| Flow rate of Ar gas | | about 150 ± about 2 SCCM |

Characteristic Evaluation

Regarding the monolithic ceramic capacitor provided with the outer electrodes each including the end-surface outer electrode and the side-surface outer electrodes, which were produced as described above, a tape peel test to check the outer electrodes for adhesion strength and a high-temperature and high-humidity load test to check the monolithic ceramic capacitor for reliability were performed by methods described below.

(1) Tape Peel Test

In this embodiment, as materials for the layers of the side-surface outer electrodes in contact with the ceramic multilayer body, seven types of metals (Na, Mg, Al, Ti, W, Cr, Ni, and Cu), in which Ti described above was included, given in Table 2 below and two types of alloys (a NiCr alloy and a NiTi alloy) given in Table 3 below were used. Samples including about 100-nm-thick layers (sputtered electrode layers) composed of the seven types of metals and the two types of alloys were produced and subjected to the tape peel test. All the outermost layers of the side-surface outer electrodes (sputtered outermost layers) were formed of sputtered Cu films having a film thickness of about 600 nm.

In each of the samples subjected to the tape peel test, Cu plating films were formed by electrolytic plating (wet plating) so as to entirely cover surfaces of the outer electrodes including the end-surface outer electrodes and the side-surface outer electrodes. FIG. 1 illustrates the monolithic ceramic capacitor in a state in which no plating film was formed.

(1-1) Method of Tape Peel Test

A main surface (LW (Length-Width) surface in FIG. 1) of each sample (monolithic ceramic capacitor) was bonded to a glass epoxy substrate.

An adhesive tape (Cellophane tape (registered trademark) No. 252, manufacture by Sekisui Chemical Co., Ltd) was bonded to a main surface of the sample (monolithic ceramic capacitor) opposite the main surface bonded to the glass epoxy substrate. The tape was pulled in the longitudinal direction of the sample (for example, the direction indicated by arrow A in FIG. 1) at a constant tension to detach the sample from the glass epoxy substrate (180° peel test).

The sample was observed as to whether any of the sputtered films (any of the layers, such as the sputtered Ti films, in contact with the ceramic multilayer body and the sputtered Cu films serving as the outermost layers) was detached, with an optical microscope at a magnification of about ×20.

(1-2) Evaluation

The foregoing test was performed on about 20 specimens for each sample (monolithic ceramic capacitor). A sample in which the detachment of the sputtered film of any of the specimens occurred was rated as poor. A sample in which no detachment of the sputtered film of any of the specimens occurred was rated as good.

Tables 2 and 3 describe the results of the tape peel test.

TABLE 2

| Type of metal | Standard redox potential (V) | Evaluation of peel test |
|---|---|---|
| Na | about −2.71 | not formed |
| Mg | about −2.36 | good |
| Al | about −1.68 | good |
| Ti | about −1.63 | good |
| W | about −1.07 | good |
| Cr | about −0.74 | good |
| Ni | about −0.26 | poor |
| Cu | about 0.34 | poor |

TABLE 3

| Type of metal (alloy) | Evaluation of peel test |
|---|---|
| $Ni_{99}Cr_1$ | poor |
| $Ni_{97}Cr_3$ | good |
| $Ni_{95}Cr_5$ | good |
| $Ni_{90}Cr_{10}$ | good |
| $Ni_{99}Ti_1$ | poor |
| $Ni_{97}Ti_3$ | good |
| $Ni_{95}Ti_5$ | good |
| $Ni_{90}Ti_{10}$ | good |

As described in Table 2, in all of the samples in which the sputtered films composed of Mg, Al, Ti, W, and Cr, which have standard redox potentials of about −2.36 V to about −0.74 V, among a total of seven types of metals, i.e., Na, Mg, Al, Ti, W, Cr, Ni, and Cu, were formed as the layers in contact with the ceramic multilayer bodies, no detachment of the sputter films in the samples was observed. In these samples, good results of the tape peel test were obtained.

In the sample in which Na, which has a standard redox potential of about −2.71 V, was used as a metal material constituting the layer in contact with the ceramic multilayer body, it was impossible to form the sputtered film. Metals, such as Na, having lower standard redox potentials than that of Mg are not stable as oxides and are easy to ionize. Such metals are inadequate for the formation of metal films.

In an embodiment of the present invention, thus, a metal which is stably present in the form of an oxide and which has a higher standard redox potential than that of Mg is preferably used as a metal constituting the layer in contact with the ceramic multilayer body.

In the samples including Ni having a standard redox potential of about −0.26 V and Cu having a standard redox potential of about 0.34 V, the detachment of the sputtered films occurred. The results demonstrated that the samples were not preferred.

A possible reason for this is as follows: Ni and Cu each have a higher standard redox potential than the range of an embodiment of the present invention. Thus, a function to receive oxygen from a ceramic contained in the ceramic multilayer body and share the oxygen element is insufficient, thereby failing to high adhesion strength.

Metals having low redox potentials are stable in the form of oxides and are easy to oxidize. The foregoing metals (Mg, Al, Ti, W, and Cr) having standard redox potentials of about −2.36 V to about −0.74 V receive oxygen from the ceramic (in this case, $BaTiO_3$) contained in the ceramic multilayer body and share the oxygen element, thereby achieving high adhesion strength.

As described in Table 3, in the samples containing the alloys each having a Cr or Ti content of about 3% by mass or more (i.e., $Ni_{97}Cr_3$, $Ni_{95}Cr_5$, $Ni_{90}Cr_{10}$, $Ni_{97}Ti_3$, $Ni_{95}Ti_5$, and $Ni_{90}Ti_{10}$) among the samples including the sputtered films composed of the NiCr alloy and the NiTi alloy as the layer in contact with the ceramic multilayer body, no detachment of the sputtered films was observed. In these samples, good results of the tape peel test were obtained.

In the expression of the alloy composition, for example, "$Ni_{90}Cr_{10}$" indicates an alloy having a Ni content of about 90% by mass and a Cr content of about 10% by mass. The same is true for other alloys.

In the case of the samples including the alloys ($Ni_{99}Cr_1$ and $Ni_{99}Ti_1$) each having a Cr or Ti content less than about 3% by mass, the detachment of the sputtered films occurred. The results demonstrated that the samples were not preferred.

(2) High-Temperature and High-Humidity Load Test (Reqliability Test)

As materials for the outermost layers of the side-surface outer electrodes (sputtered outermost electrode layers), in which Cu described above was included, five types of metals (Pd, Ni, Cu, Al, and Ag) given in Table 4 below and three types of NiCu alloys ($Ni_{90}Cu_{10}$, $Ni_{70}Cu_{30}$, and $Ni_{50}Cu_{50}$) having different compositions given in Table 5 below were used. Samples including metal layers and alloy layers (sputtered electrode layers) composed of the five types of metals and the three types of NiCu alloys were produced and subjected to the high-temperature and high-humidity load test (reliability test). In each of the samples subjected to the high-temperature and high-humidity load test, Cu plating films were formed by electrolytic plating (wet plating) so as to entirely cover surfaces of the outer electrodes including the end-surface outer electrodes and the side-surface outer electrodes.

(2-1) Method of High-Temperature and High-Humidity Load Test

The high-temperature and high-humidity load test was performed on each sample under conditions: temperature: about 125° C., humidity: about 95% RH, voltage: about ½ WV (about 3.2 V), time: about 72 hours, and the number of specimens (n) for each sample: about 10. A sample in which an IR value after the completion of the test was about two orders of magnitude smaller than an IR value immediately after the initiation of the test was rated as poor in reliability.

Tables 4 and 5 describe the results.

TABLE 4

| Type of metal | Heat of solution of hydrogen (kJ/molH) | Percent defective in high-temperature and high-humidity test (%) |
| --- | --- | --- |
| Pd | about −10 | about 100 |
| Ni | about 16 | about 90 |
| Cu | about 42 | about 0 |
| Al | about 67 | about 0 |
| Ag | about 68 | about 0 |

TABLE 5

| Type of alloy | Heat of solution of hydrogen (kJ/molH) | Quantitative value of Cu determined by ULV-SEM/EDX | Percent defective high-temperature and high-humidity test (%) |
| --- | --- | --- | --- |
| $Ni_{90}Cu_{10}$ (Cu = about 9.30 mol % when expressed in terms of mol %) | about 18.4 | about 8 | about 70 |
| $Ni_{70}Cu_{30}$ (Cu = about 28.4 mol % when expressed in terms of mol %) | about 23.4 | about 22 | about 0 |
| $Ni_{50}Cu_{50}$ (Cu = about 48.0 mol % when expressed in terms of mol %) | about 28.5 | about 45 | about 0 |

In Tables 4 and 5, the values of the heat of solution of hydrogen in the metals and the alloys are described. The values of the heat of solution of hydrogen in the alloys ($Ni_{90}Cu_{10}$, $Ni_{70}Cu_{30}$, and $Ni_{50}Cu_{50}$) given in Table 5 are calculated from the molar ratios of Ni to Cu using the values of the heat of solution of hydrogen in the metals (Ni and Cu) constituting the alloys. Ni and Cu form complete solid solutions. Thus, the values of the heat of solution of hydrogen calculated from the molar ratios of Ni to Cu using the values of the heat of solution of hydrogen in the metals (Ni and Cu) constituting the alloys are believed to be fairly reliable values.

(2-2) Evaluation

As described in Table 4, regarding the samples including the sputtered films composed of Pd, in which the heat of solution of hydrogen is about −10 kJ/molH, and Ni, in which the heat of solution of hydrogen is about 16 kJ/molH, among a total of five types of metals, i.e., Pd, Ni, Cu, Al, and Ag, the sputtered films being formed as the outermost layers (sputtered outermost electrode layers) of the side-surface outer electrodes, the occurrence of failure was observed in the high-temperature and high-humidity load test. The results demonstrated that the samples were not preferred.

In contrast, regarding the samples including the sputtered films composed of Cu, Al, and Ag, which are metals in which the heat of solution of hydrogen is about 42 kJ/molH or more, the sputtered films being formed as the outermost layers (sputtered outermost electrode layers) of the side-surface outer electrodes, the occurrence of failure was not observed in the high-temperature and high-humidity load test. The results demonstrated that the samples were highly reliable.

As described in Table 5, regarding the sample including the sputtered films composed of $Ni_{90}Cu_{10}$, in which the heat of solution of hydrogen is about 18.6 kJ/molH, among the NiCu alloys ($Ni_{90}Cu_{10}$, $Ni_{70}CH_{30}$, and $Ni_{50}Cu_{50}$), the sputtered films being formed as the outermost layers of the side-surface outer electrodes, the occurrence of failure was observed in the high-temperature and high-humidity load test. The results demonstrated that the sample was not preferred.

In contrast, regarding the samples including the sputtered films composed of the $Ni_{70}Cu_{30}$ alloy, in which the heat of solution of hydrogen is about 23.8 kJ/molH, and the $Ni_{50}Cu_{50}$ alloy, in which the heat of solution of hydrogen is about 29.0 kJ/molH, the sputtered films being formed as the outermost layers of the side-surface outer electrodes, the occurrence of failure was not observed in the high-temperature and high-humidity load test. The results demonstrated that the samples were preferred.

Table 5 also describes the Cu contents (mol %) of the sputtered films composed of the alloys of Ni and Cu, the Cu contents being measured by ultra-low-voltage scanning electron microscope/energy-dispersive X-ray diffraction (ULV-SEM/EDX) analysis. The ULV-SEM/EDX analysis was performed by a method described below.

After the surfaces of the electrode films (sputtered films) constituting the outermost layers of the side-surface outer electrodes were processed by about 5° with a focused ion beam (FIB), the measurement (analysis) of Cu was performed by ULV-SEM/EDX under conditions described below.

Acceleration voltage: about 4 kV
Angle of inclination: about 0°
Number of measurement points: about 60 points
Measurement time for 1 point: about 20 seconds The measurement was performed by ULV-SEM/EDX at about 60 points each having a width of about 5 to about 6 μm and being spaced at intervals of about 0.1 μm in the middle region of each of the electrode films (sputtered films) constituting the outermost layers of the side-surface outer electrodes. The average value of the resulting values was defined as a quantitative value.

Table 5 also describes the Cu contents of the $Ni_{90}Cu_{10}$, $Ni_{70}CH_{30}$, and $Ni_{50}Cu_{50}$ alloys used for the formation of the sputtered films in terms of mol %.

In an embodiment of the present invention, the metals and alloys (such as Cu, Al, Ag, and alloys containing these metals) in which the heat of solution of hydrogen is about 23.8 kJ/molH or more and in which hydrogen is not easily dissolved are used as the electrode films constituting the outermost layers of the side-surface outer electrodes. This results in, for example, high resistance to a plating solution used at the time of plating for the outer electrodes and high resistance to hydrogen generated in a plating process.

If a metal, such as elemental Ni metal, in which hydrogen is easily dissolved is selected as a metal constituting the outermost layers, hydrogen diffuses into the ceramic multilayer body through Ni and reaches the inner electrodes. When hydrogen reaches the inner electrodes, the inner electrodes are expanded by the diffusion of hydrogen to lead to the occurrence of cracking of the ceramic body, a reduction in insulation resistance (IR), and a reduction in insulation resistance in the reliability test. Thus, such a metal is not preferred.

In the foregoing embodiment, the case where the monolithic ceramic electronic component is a low-profile monolithic ceramic capacitor used in a state in which the monolithic ceramic capacitor is buried in a ceramic substrate has been described as an example. The present invention is not limited to the low-profile monolithic ceramic capacitor as described above and may also be applied to a normal surface-mount monolithic ceramic capacitor.

The present invention is not limited to the monolithic ceramic capacitor and may be applied to other monolithic ceramic electronic components. For example, the present invention may be applied to monolithic inductors, monolithic LC composite components, ceramic multilayer boards, and so forth.

The present invention is not limited to the foregoing embodiments in any other point. With regard to the thickness and constituent materials of the end-surface outer electrodes and the side-surface outer electrodes constituting the outer electrodes, the thickness and combinations of constituent materials of the layers of the side-surface outer electrodes in contact with the ceramic multilayer body and the outermost layers of the side-surface outer electrodes, the presence or absence of the plating films formed so as to cover the end-surface outer electrodes and the side-surface outer electrodes, the constituent material of the plating film when the plating film is formed, and so forth, various applications and changes may be made within the scope of the invention.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A monolithic ceramic electronic component having a structure comprising:
   a ceramic multilayer body including
      stacked ceramic layers, and
      inner electrodes arranged between adjacent ceramic layers of the stacked ceramic layers;
   a first outer electrode arranged on the ceramic multilayer body, the first outer electrode being electrically connected to a first plurality of the inner electrodes; and
   a second outer electrode arranged on the ceramic multilayer body, the second outer electrode being electrically connected to a second plurality of the inner electrodes,
   wherein
   (a) the first and second outer electrodes each include
   an end-surface outer electrode arranged on an end surface of the ceramic multilayer body, and
   a side-surface outer electrode on side surfaces in contact with the end surface of the ceramic multilayer body, the side-surface outer electrode being electrically connected to the end-surface outer electrode, and
   (b) the side-surface outer electrode includes a first sputtered electrode layer and a second sputtered electrode layer,
   the first sputtered electrode layer contacting the ceramic multilayer body and including a material containing a first metal with a standard redox potential of about −2.36 V to about −0.74 V, a proportion of the first metal in the material being about 3% by mass or more,
   the second sputtered electrode layer including a second metal or an alloy in which a heat of solution of hydrogen is about 23.8 kJ/molH or more,
   the first sputtered electrode layer including a material that is different from a material of the end-surface outer electrode, and
   the side-surface outer electrode only overlaps an edge of the end-surface outer electrode.

2. The monolithic ceramic electronic component according to claim 1, wherein the second sputtered electrode is an outermost layer of the side-surface outer electrode.

3. The monolithic ceramic electronic component according to claim 1, wherein the first metal contained in the first sputtered electrode layer is at least one selected from the group consisting of Mg, Al, Ti, W, and Cr.

4. The monolithic ceramic electronic component according to claim 3, wherein the second metal contained in the second sputtered electrode layer is at least one selected from the group consisting of Cu, Al, and Ag, or an alloy containing at least one selected from the group consisting of Cu, Al, and Ag.

5. The monolithic ceramic electronic component according to claim 1, wherein the second metal contained in the second sputtered electrode layer is at least one selected from the group consisting of Cu, Al, and Ag, or an alloy containing at least one selected from the group consisting of Cu, Al, and Ag.

6. The monolithic ceramic electronic component according to claim 1, further comprising:
   a plating metal film on surfaces of the first and second outer electrodes.

7. The monolithic ceramic electronic component according to claim 3, further comprising:
   a plating metal film on surfaces of the first and second outer electrodes.

8. The monolithic ceramic electronic component according to claim 4, further comprising:
   a plating metal film on surfaces of the first and second outer electrodes.

9. The monolithic ceramic electronic component according to claim 5, further comprising:
   a plating metal film on surfaces of the first and second outer electrodes.

* * * * *